Dec. 16, 1952    J. BURES ET AL    2,621,526
MECHANICAL POWER TRANSMISSION
Filed Nov. 8, 1947    3 Sheets-Sheet 1
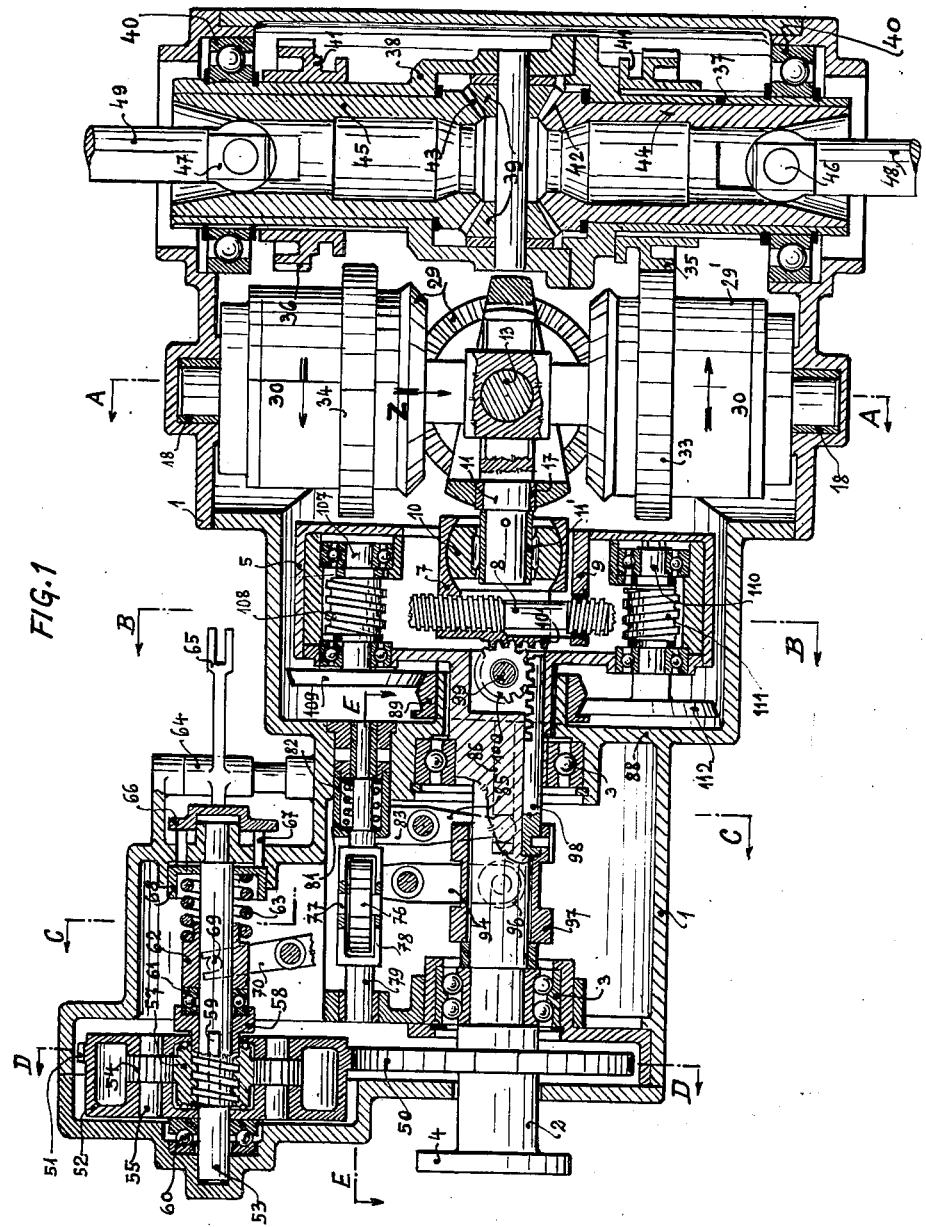
INVENTORS
Josef Bureš and Karel Benák
BY
ATTORNEY

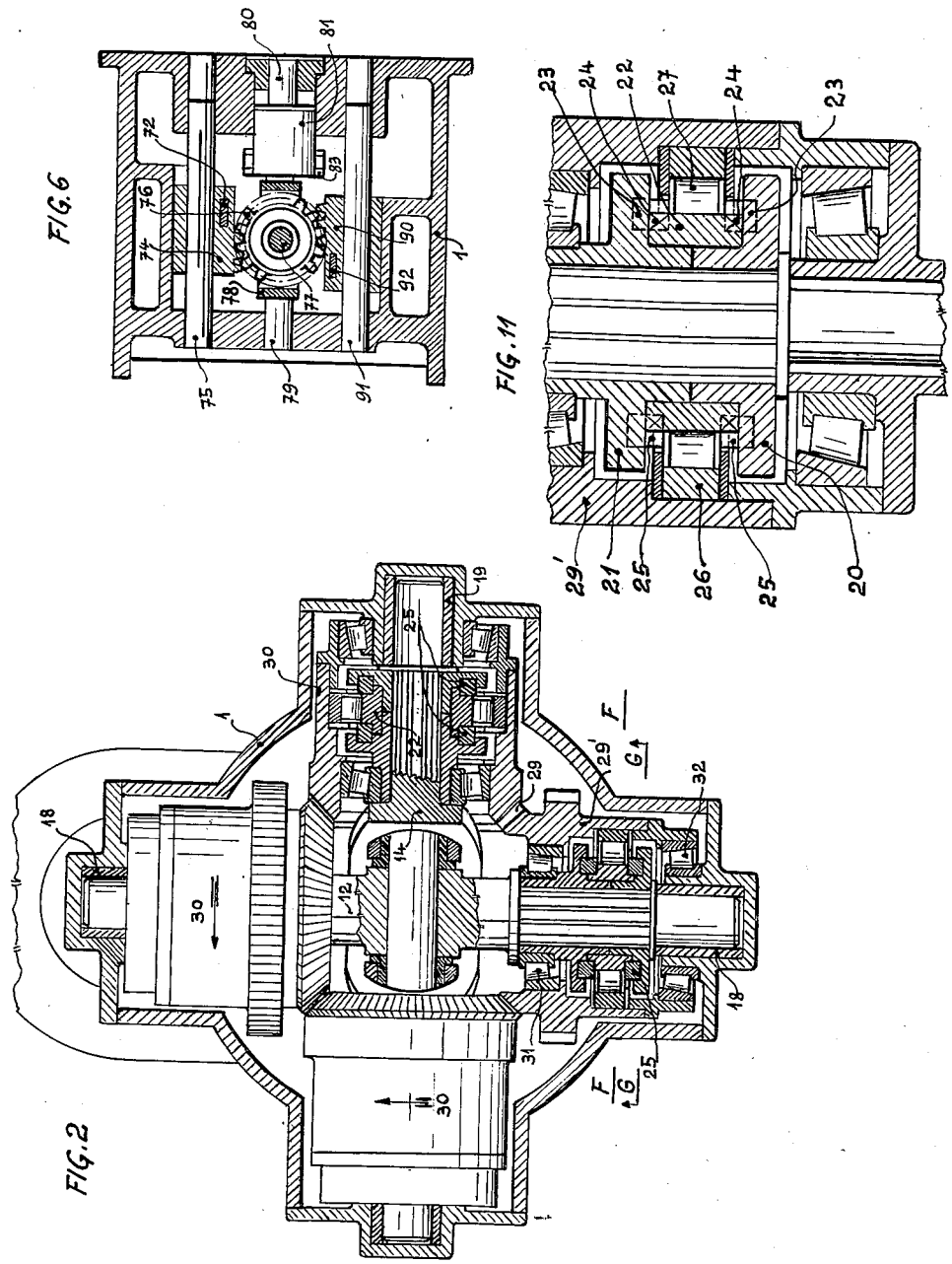

Dec. 16, 1952     J. BURES ET AL     2,621,526
MECHANICAL POWER TRANSMISSION
Filed Nov. 8, 1947     3 Sheets-Sheet 3
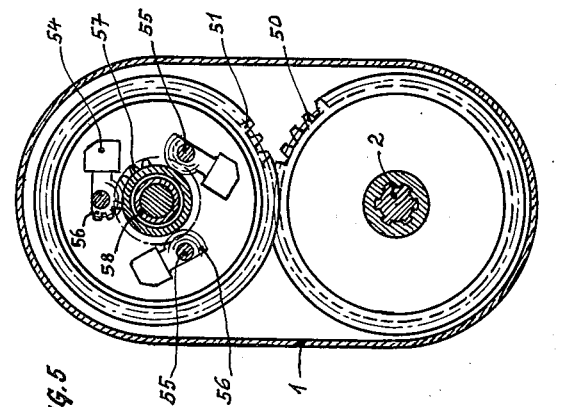
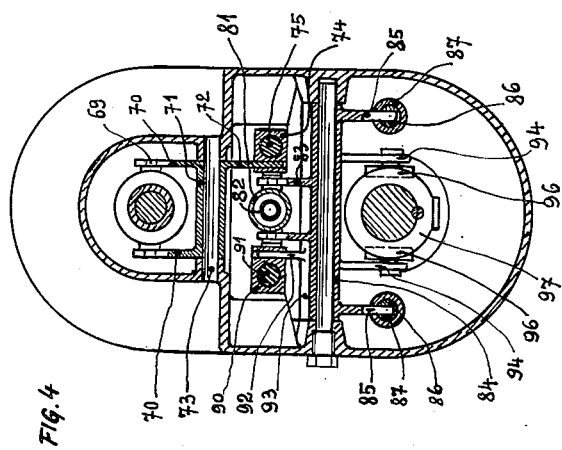
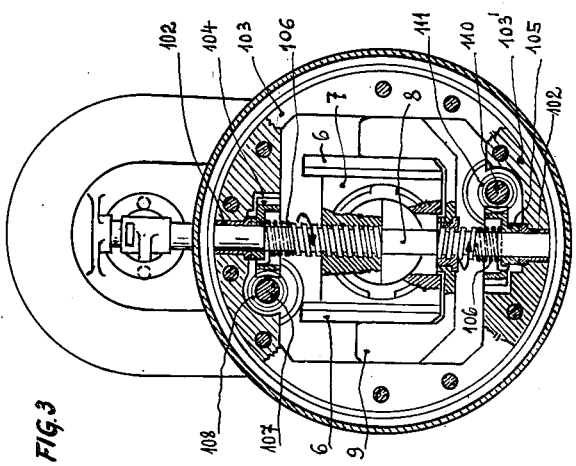
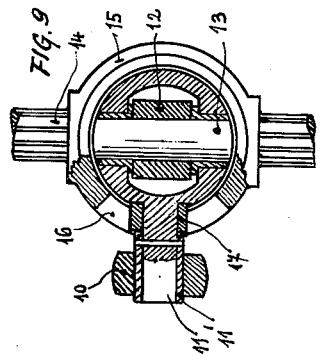
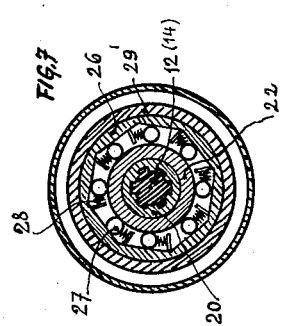
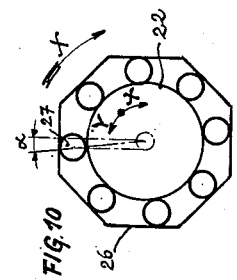
INVENTORS
Josef Bureš and Karel Benák
BY
ATTORNEY Patented Dec. 16, 1952

2,621,526

UNITED STATES PATENT OFFICE 2,621,526

MECHANICAL POWER TRANSMISSION

Josef Bureš and Karel Benák, Pilsen, Czechoslovakia

Application November 8, 1947, Serial No. 784,862
In Czechoslovakia November 22, 1945

Section 1, Public Law 690, August 8, 1946
Patent expires November 22, 1965

4 Claims. (Cl. 74—114)

This invention relates to a new and useful improvement in mechanical power transmission.

A particular object of this invention is to produce a device for transmission of power specially for cases where continuous and stepless change of speeds from zero to maximum is desired. Such devices can be used in automobile tractors and other vehicles to great advantage for the operator and would also result in fuel saving.

A further object of this invention is to simplify the construction of the power transmission as used in connection with transmitting the power from an internal combustion engine by entirely eliminating the use of friction or similar type clutch which is a necessary element when normal type of gear shifting transmission is used.

A still further object of this invention is to provide this transmission with such control of speed as to be able to utilize the rotation of a driving shaft for actuating the speed changing means.

Another object of this invention is to produce a power transmission with automatic speed controlling means for adjusting the speeds so as to correspond to the rate of rotation of the driving shaft.

An important object of this invention is also to provide a transmission suitable for such machines in which very large masses have to be accelerated and brought into motion.

A construction designed to carry on the invention will be hereinafter described together with other features of the invention.

The invention will be more readily understood from a reading of the following specification and by reference to the accompanying drawings in which an example of the invention is shown, and wherein:

Figure 1 is a partial longitudinal section in a horizontal plane through the housing on the line of the axis of the driving shaft, Fig. 2 is a vertical sectional view taken on line A—A of Fig. 1, Fig. 3 is a partial sectional view taken on line B—B of Fig. 1, Fig. 4 is a sectional view taken on line C—C, Fig. 1, Fig. 5 taken on line D—D, Fig. 1, Fig. 6 is a partial sectional view taken in a vertical plane on line E—E, Fig. 1, Fig. 7 and Fig. 8 are sectional views on lines F—F and G—G respectively of Fig. 2, Fig. 9 is a partial sectional view of the joint between the driving lever and oscillating shafts taken on the center line of the driving lever in direction of arrow Z in Fig. 1, Fig. 10 shows diagrammatically the relative location of rollers between the rings of the freewheeling mechanism, Fig. 11 is an enlarged sectional view of the freewheeling mechanism taken on the axis of one of the oscillating shafts.

The transmission shown in the drawings is of a construction particularly adapted for use in automobiles.

In the drawings the numeral 1 designates the main housing in which the elements of the transmission are mounted.

The driving shaft 2 can rotate in bearings 3. Flange 4 on the outer end of this shaft serves for connection to the engine shaft. A drum 5 is fastened to the other end of shaft 2 and provided with guides 6 (Fig. 3) to which a sliding head 7 is fitted capable of radial motion by turning the screw shaft 8 which is provided with a right hand screw thread near one end and a left hand thread near the other end. The right hand screw fits into the thread of the sliding head 7 and the left hand screw into the thread of the balance weight 9. When the shaft 8 turns the head 7 and balance weight 9 move always in opposite direction to each other.

The sliding head 7 is provided with a spherical bearing face into which a bearing block 10 is turnably fitted. This block forms also a bearing in which sleeve 11' fixed on the end of driving lever 11, can turn and slide. The other end of lever 11 is shaped in form of a ring (Fig. 9) around the oscillating shaft 12 to which it is pivotably connected by means of a pin 13 which is held fast in the shaft 12. The axis of oscillating shaft 14 is arranged at right angle to the axis of shaft 12 and its middle part forms a ring 15 around pivot of the lever 11 and shaft 12. In one half of ring 15 a slot 16 is cut through forming two sliding faces for square block 17 which is pivoted around lever 11. When lever 11 is rotated in an inclined position the above described arrangement forces the shafts 12 and 14 to make oscillatory movements around their respective axes.

In the drawings the lever 11 is shown in zero position that is in nonoperative position at which the axis of this lever is identical with prolongation of the axis of shaft 2. In that case lever 11 stands still and bearing block 10 and sliding head 7 revolve around it with the drum 5.

Shafts 12 and 14 are mounted in bearings 18 and 19 respectively, formed in the housing 1 and near these bearings splines are arranged on each shaft onto which discs 20 and 21 are fitted and freewheeling mechanisms 30 are arranged. There are thus two freewheeling mechanisms fitted to each oscillating shaft.

In Fig. 2 where both mentioned shafts appear at right angle to each other, two freewheeling mechanisms are shown in section and two in view. Fig. 7 shows these mechanisms in cross section on line F—F and Fig. 8 on line G—G of Fig. 2. Fig. 11 is an enlarged section of this mechanism showing the same section as in Fig. 2.

Ring 22 with cylindrical inner and outer faces is loosely fitted on the hubs of discs 20 and 21 but held from turning by four stiff semicircular springs 25 fitting into cavities formed in flanges of discs 20 and 21 and butting with their ends halfway against the stops 23 formed on discs 20 and 21 and halfway against the stops 24 formed on sides of the ring 22.

This arrangement of springs is such that when the resistance against turning on the circumference of the ring 22 is met all four springs are pressing with their ends located in the direction of rotation only against the stops 24 of the ring 22 and the other ends against the stops 23 of the discs 20 and 21 (Figs. 11 and 8).

Around the ring 22 another ring 26 is arranged provided with an octagonal opening on the inside and a cylindrical face on the outside. Between the outer cylindrical face of ring 22 and the inner octagonal faces of ring 26 rollers 27 are placed and pressed by springs 28 into the space formed between the two rings 22 and 26, as shown in Fig. 7 and Fig. 10. As the rollers are of slightly smaller diameter than the smallest clearance between the two rings the rollers wedge into this clearance when rotation of the ring 22 is in direction of arrow X in Fig. 10 and take the ring 26 with it. When turning in opposite direction, with arrow Y, the rollers loosen up and ring 26 will either stand still or continue by inertia in its rotation in the direction of arrow X. Ring 26 is fastened inside of the drum 29' which is provided with bevel gear 29 and turns on bearings 31 and 32. Both drums of the oscillating shaft 12 are provided with spur gears, one drum with gear 33 the other with gear 34. Each bevel gear 29 of the drums of freewheeling mechanisms meshes into two neighboring ones. Gear 33 as shown in Fig. 1 is meshing with gear 35 which is held from turning on sleeve 37 but can slide on same axially.

Sleeve 37 forms with the sleeve 38 a housing for the planetary gears 39 of a differential. These sleeves turn in bearings 40 mounted in housing 1. On the sleeve 38 a gear 36 is so arranged that it can slide axially on it without turning. Gears 35 and 36 are provided with collars 41 for forks of a shifting mechanism which is not shown in drawings. Gears 42 and 43 form a differential with the planetary gears 39 and can turn with their prolonged hubs 44 and 45 in bearings formed in sleeves 37 and 38. In hubs 44 and 45 universal joints 46 and 47 are formed for shafts 48 and 49 on which driving wheels are mounted. The shifting of gears 35 and 36 by shifting mechanism is arranged so that when gear 35 is in mesh with gear 33 the gear 36 is out of mesh with gear 34 and when gear 36 is meshing with gear 34 gear 35 is out of mesh. Gears 33 and 34 mounted on drums of shaft 12 are always rotating in opposite direction to each other as indicated in the drawings by arrows.

To the driving shaft 2 near flange 4 a spur gear 50 is rigidly connected meshing into gear 51 fastened to a drum 52 of a centrifugal governor mounted on shaft 53.

Weights 54 (Fig. 5) are pivoted on pins 55 fastened to the flange of drum 52. Partial pinions 56 of the weights mesh with a spur gear 57 which on the inside of its hub is provided with a steep thread (45°) fitting loosely around the thread of sleeve 58 which can slide axially on shaft 53 however is kept from turning by the feather 59 (Fig. 1). A thrust bearing 60 is provided between the housing 1 and governor drum 52 and ball bearing 61 between the flange of sleeve 58 and collar 62 which is pressed against it by spring 63. This spring may be more compressed by cam 64 by moving the lever 65 through medium of plate 66, pins 67 acting against a washer 68.

Collar 62 is provided with pins 69 fitting into slots of arms 70 forming with hub 71 and an arm 72 a lever pivoted around pin 73 (Fig. 4). Arm 72 has a rounded end which fits into a groove cut in rack 74 (Figs. 4 and 6) slidable on pin 75 and meshing with pinion 76 which can turn around pin 77. This pin is held in a forked head 78 provided with cylindrical extensions 79 and 80 sliding in bearings formed in housing 1. Sleeve 81 can slide axially in an extension 80 against the double acting spring 82. The two arms 83 are in one piece with hub 84 and the two arms 85. Into slots on the ends of arms 83 reach pins arranged on sleeve 81 and arms 85 reach with their rounded ends into slots cut in rods 86 guided in bearings 87 formed in dividing wall 88 of the housing 1. Rods 86 are fastened to a flange of double cone pulley 89 which can slide on the hub formed on dividing wall 88 but held from turning by the rods 86.

Rack 90 can slide on pin 91 and meshes with its teeth into the pinion 76 on the opposite side of the rack 74. Rack 90 is provided with a slot into which the rounded end of arm 92 reaches. This arm is in one piece with hub 93 and the two arms 94 which carry rollers 95 fitting into a groove formed around collar 97 (Figs. 1 and 4). This collar can slide on shaft 2 axially and the rod 98 is fastened to it by one end and meshes with the rack cut on the other end of it into pinion 100. This pinion can turn around pin 99 and is arranged in the hub of drum 5 and meshes into the rack 101 fastened to the sliding head 7 (Fig. 1).

Shaft 8 is supported in bearings 102 formed in pieces 103 and 103' fastened to the drum 5 (Fig. 3). Near these bearings worm gears 104 and 105 are arranged on shaft 8. To these gears springs 106 wound close to the shaft 8 are fastened by one end and act as one-way clutches so that gear 104 may make the shaft 8 to turn only in one direction and gear 105 only in opposite direction as shown by arrows in Fig. 3. Shaft 107 is provided with a worm 108 and a friction disc 109, shaft 110 with worm 111 and a friction disc 112 (Figs. 3 and 1). Worm 108 meshes into gear 104 and a worm 111 into gear 105. The friction disc 109 is located on the right side of the double cone pulley 89 and the disc 112 on the left side of same. When the cone pulley is in its normal nonoperating position there is a very small clearance between the faces of the cone pulley 89 and the friction discs 109 and 112.

The operation of this mechanism as here described and shown in drawings is as follows.

The engine is started in a normal way. As soon as the engine starts to run it immediately takes with it the driving shaft 2 as the same is permanently connected to the engine shaft.

The drum 5 will thus be also rotated together with the sliding head 7, and the center line of the bearing block 10 will be exactly identical with the centerline of shaft 2. The rotation of shaft 2 is transferred to the governor drum by medium of gears 50 and 51.

The bearing block 10 stays in the mentioned position, which may be called zero position, until certain predetermined speed of rotation of shaft 2 is reached.

When this is reached the weights 54 (Fig. 5) overcome the pressure of the spring 63 by centrifugal force, start to turn around the pins 55 and turn the gear 57 which by the action of the screw threads move the sleeve 58 axially against ball bearing 61 and collar 62 thus compressing the spring 63 farther until equilibrium is reached.

The collar 62 moves rack 74' by means of the lever arms 70 and 72 to the left side (Fig. 1) thus causing the pinion 76 to turn around pin 77. As the rack 90 is held stationary the forked head 78 is forced to move also to the left side. This motion is further transferred through the double acting spring 82 to sleeve 81 and by arms 83 and 85 to the rods 86 and thus to the double cone pulley 89 which will be moved to the right.

This motion will cause the double cone pulley to get in contact with the disc 109 and cause its rotation and through medium of worm 108 and gear 104 the shaft 8 will also rotate. That will cause the head 7 to move a certain small distance out of the centerline of the shaft 2. During this motion rack 101 fastened on the head 7 turns the pinion 100 and the motion is transferred by medium of rod 98, collar 97, and arms 94 and 92 to rack 90 and further to the pinion 76 which will cause the forked head 78 to move to the left, that is back to its original position. That will cause also a movement of the double cone pulley 89 back to its nonoperating position between the discs 109 and 112. That is accomplished through medium of the same elements as already described for the motion of pulley 89 into operating position.

From the foregoing description follows that for a certain speed of rotation of shaft 2, this transmission will adjust automatically the head 7 in a certain distance from the center of rotation.

To a certain distance of the head 7 from the center of rotation corresponds a certain angle of inclination of the driving lever 11. When rotated in this inclined position the center line of lever 11 describes a cone with its apex lying in the intersection of the centerlines of the oscillating shafts 12 and 14.

The center lines of shafts 12 and 14 are located in one plane at right angles to each other and in their intersection the pivotal center of the lever 11 is located. Through this intersection passes also the prolonged centerline of the driving shaft 2, forming a right angle to the mentioned plane of shafts 12 and 14.

When the head 7 is rotated in its zero position the lever 11 will stand still and its axis will be identical with the axis of shaft 2 and the head 7 with the bearing block 10 will rotate around it. When lever 11 is rotated in its inclined position its centerline will describe an apex angle which is twice the size of the angle of its inclination.

During one revolution of lever 11 the oscillating shaft 12 is forced to move through an angle which is equal to the apex angle of the lever 11 twice, first in one and then in the opposite direction.

Shaft 14 is forced to make the same oscillating motion as the shaft 12 only it is timed 90° behind.

Shaft 12 transfers its motion through the described freewheeling mechanism twice during one revolution of the lever 11, once when moving in one direction, to the left side drum, and when returning in opposite direction, to the right side drum. In other words one drum is taking motion in one direction and the other drum in opposite direction as indicated in Figs. 1 and 2 by arrows. The two drums located on the shaft 14 transfer the motion in the same manner as described for shaft 12.

As the four drums of this mechanism are provided with bevel gears 29" meshing one into the two neighboring ones they are all connected together so that gear 33 or 34 arranged on the drums of shaft 12 transfers the motion from all four freewheeling mechanisms further to the gear 35 or 36 which happens to be just in mesh.

When we change the angle of inclination of lever 11 from zero to a maximum, say about 12°, we can see that at zero position the lever 11 does not rotate but is standing still and thus the oscillating shafts will not move and also no motion whatever will be transferred to the drums.

When we gradually increase the inclination of lever 11 the magnitude of the angle through which the shafts 12 and 14 oscillate will increase and proportionally thereto the speed of rotation of the drums will also increase.

As the gears 33 and 34 rotate in opposite directions it is clear that we can reverse the direction of rotation of the housing 37, 38 of differential gear and thus of the shafts 48 and 49 by shifting the gear 35 out of mesh with gear 33 and gear 36 in mesh with 34. Supposing that the maximum angle of inclination of lever 11 for mechanism under consideration is 12 degrees, then for this angle the ratio of the revolutions of driving shaft 2 to the revolutions of the drums would be about 5 to 1.

This ratio will then increase with diminishing inclination of lever 11 and at its zero position wll be infinite.

When the resistance to the driving is increased for any reason the revolutions of the motor and thus of shaft 2 will decrease and the weights of the centrifugal governor will return partly back nearer to its original position until balance between the force of the spring and of the centrifugal force is reached. This action will cause the double cone pulley 89 to move to the left side (Fig. 1) thus engaging the disc 112 which through medium of worm 111, gear 105 and spring 106 will cause the shaft 8 to turn and bring the head 7 nearer to the center of rotation. The actions of the other elements will then follow as above described and stabilize the head 7 in a certain position closer to the center of rotation. That is the transmission ratios will be increased so as to correspond to the heavier load.

By setting lever 65 at different angles spring 63 of the governor mechanism will be further compressed by means of cam 64, pins 67 and washer 68.

That will cause the resistance to the action of the governor to increase and also the double cone pulley 89 to start to actuate the motion of the head 7 from center at higher speed of the driving shaft 2 than with normal setting of the spring.

From the foregoing it is clear that the automatic device of this transmission also tends to place the head 7 in a position in which the ratio of transmission corresponds to the magnitude of the resistance offered against the motion.

As the rate of rotation of the shaft 2 and lever 11 may be considered constant during each revolution the shafts 12 and 14 will oscillate through a certain angle with angular velocities changing twice from zero to maximum and back to zero according to a sinus curve. The angular velocity of these shafts at the peak of this curve will be in certain ratio smaller than the angular velocity of the driving shaft 2 and block 10 depending on the magnitude of angle of inclination of lever 11. The peak angular velocity of the oscillating shafts will be transferred to the drums through the individual freewheeling mechanisms by impulses one after the other in the order in which these are grouped around the center (Fig. 2), that, is four impulses during each revolution. The springs 25 (Figs. 8 and 2) yield a little when transferring the motion from the oscillating shaft to the rings 22 and further through rollers 27 to the drum thus making the impact milder and causing the peaks of angular velocities transferred to the drums to be a trifle lower than those of the shafts 12 and 14 and tend to prolong the time of power contact of the rollers.

What we claim is:

1. In a mechanical power transmitting device, the improvement comprising in combination, a driving shaft, a drum on said shaft, radially movable head in said drum for actuating the rotary member of a speed changing means, means for moving said movable head radially, two friction discs operatively connected to said last mentioned means, a non-rotating but axially slidable double face pulley placed around said driving shaft and between said two friction discs for actuating same, a sliding head carrying a pinion connected to said pulley by means of a springing member, two slidable parallel racks meshing with said pinion, one of said racks operatively connected to a centrifugal means and the other rack connected to said movable head.

2. In a mechanical power transmitting device of the character described, the combination of a driving member, a pivoted driving lever, means for changing the inclination of said driving lever relatively to its axis of rotation, two oscillating shafts at right angle to each other operatively connected to said driving lever, two freewheeling mechanisms located on each oscillating shaft, each freewheeling mechanism provided with a bevel gear, each of these bevel gears meshing with two neighboring ones, only two of the four freewheeling mechanisms located on a common oscillating shaft each provided with another gear and a driven shaft parallel to the last mentioned oscillating shaft provided with slidable gears adapted to transmit the rotary motion from one or the other gears of said freewheeling mechanisms.

3. A power transmission mechanism comprising a casing, an input shaft extending into the casing, a rotatable bell member mounted in the casing and connected to the input shaft to be driven thereby, a transversely disposed shaft carried by the bell member, a crank pin mounted on said transversely disposed shaft, operating mechanism extending through the casing and to said bell member for rotating the transversely disposed shaft to shift the position of the crank pin, an output shaft mounted in the casing, and means operatively connecting the crank pin to the output shaft.

4. In a power transmission including a casing and an input shaft rotatably mounted in the casing, a driving bell rotatably mounted in the casing and connected to the input shaft for rotation thereby, a slide mounted on the bell transversely of the axis of the input shaft, an annular member carried by the slide, power take off means operatively connected to said annular member, and means extending into the casing and said bell for moving said slide to shift the axis of the annular member with respect to the axis of the input shaft.

JOSEF BUREŠ.
KAREL BENÁK.

REFERENCES CITED

The following references are of record in the file of this patent:

UNITED STATES PATENTS

| Number | Name | Date |
|---|---|---|
| 1,462,810 | Gill | July 24, 1923 |
| 1,760,700 | Janik | May 27, 1930 |
| 1,769,614 | Anglada | July 1, 1930 |
| 2,179,827 | Meller | Nov. 14, 1939 |
| 2,243,928 | Waterman | June 3, 1941 |
| 2,427,598 | Gouirand | Sept. 16, 1947 |

FOREIGN PATENTS

| Number | Country | Date |
|---|---|---|
| 518,365 | France | Dec. 30, 1920 |